Feb. 8, 1966 D. L. GUNN 3,234,469

FREQUENCY MODULATION RADIO RECEIVER WITH AMPLITUDE RESPONSIVE SQUELCH

Filed March 19, 1962

INVENTOR.
DAVID L. GUNN

BY Mueller & Aichele

ATTYS.

United States Patent Office 3,234,469
Patented Feb. 8, 1966

3,234,469

FREQUENCY MODULATION RADIO RECEIVER WITH AMPLITUDE RESPONSIVE SQUELCH

David L. Gunn, Lombard, Ill., assignor to Motorola, Inc., Chicago, Ill., a corporation of Illinois Filed Mar. 19, 1962, Ser. No. 180,727
2 Claims. (Cl. 325—478)

Figures 1, 2:
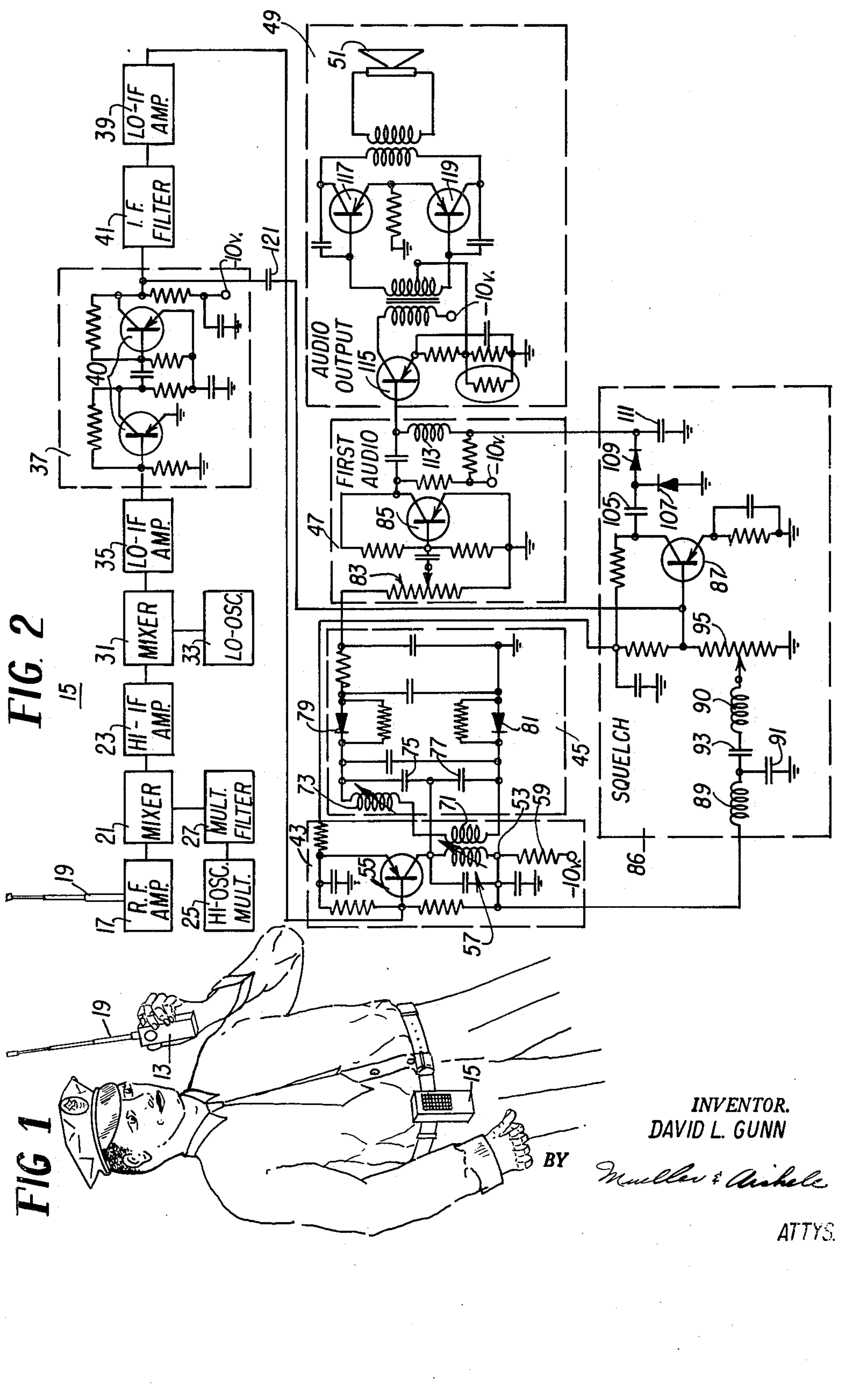

This invention relates to radio communication apparatus and more particularly to a circuit for preventing the effect of audio feedback in such apparatus.

In two-way communication systems the situation may arise where a radio transmitter and a receiver operating at the same frequency come close enough to each other so that the audio signal emanating from the receiver is picked up by the transmitter. This audio feedback results in a rapid buildup of receiver output as the input to the transmitter increases, and a rapid buildup of the transmitter input because of the increased receiver output. In other words, a regenerative effect occurs with receiver output causing transmitter input to geometrically increase, and vice versa. The results are a howl issuing from the speaker or earpiece of the receiver which renders communication difficult if not impossible.

This problem is especially significant in certain types of miniaturized two-way frequency modulation radio equipment, such as that used by the police departments of some cities. A police officer may carry a pocket transmitter and a pocket receiver on his person, ordinarily keeping his receiver on at all times in order to receive directions from headquarters. When it becomes necessary to transmit, he should turn his receiver off to avoid possible audio feedback, but he may neglect to do this in an emergency. Another instance where audio feedback can occur is where two officers are working together, or in the same locality, one having his transmitter on and the other his receiver on. Similar problems arise in other applications of two-way radio equipment.

Accordingly, an object of this invention is to eliminate audio feedback problems from two-way radio systems.

Another object of the invention is to provide an improved radio receiver having provision for reducing the effect of audio feedback.

Still another object of the invention is to provide a simple, low cost circuit for use in a radio receiver to prevent audio feedback.

A feature of the invention is the provision, in a radio receiver having a squelch circuit for controlling the audio output, of a circuit for applying a signal to the squelch circuit when a very strong signal is received to reduce the audio output of the receiver.

Another feature of the invention is the provision, in a radio receiver having an intermediate frequency amplifier stage and a squelch circuit for controlling the audio amplifier of the receiver, of impedance means coupled between the intermediate frequency amplifier stage and the squelch circuit to actuate the squelch circuit and reduce the audio output of the receiver when a very strong signal is received. The signals from the intermediate frequency amplifier may be coupled to the squelch circuit by a capacitor having a value selected to apply signals to the squelch circuit to cause the audio output of the receiver to be reduced when a very strong signal is received.

In the drawing:

FIG. 1 depicts a particular instance in which the problem of audio feedback arises; and FIG. 2 is a schematic diagram of a circuit utilizing the invention.

The radio receiver of the invention may be of the superheterodyne type for receiving frequency modulated signals, and having a squelch circuit for controlling the audio output. The squelch circuit operates in response to reduction of noise in the FM receiver to control the conductivity of an audio frequency amplifier stage. In addition to the coupling of the noise from the FM detector to the squelch circuit, signals are applied from an intermediate frequency amplifier stage to the squelch circuit in response to a very strong signal. When the output of the intermediate frequency amplifier stage becomes very strong, due to exceptionally strong signals from a nearby transmitter, the intermediate frequency signals applied to the squelch circuit affect the bias applied thereby to the audio frequency amplifier stage and reduce its gain. By reducing the gain of this stage, there is less audio output at the receiver which the transmitter may pickup, and hence the effect of audio feedback is inhibited.

There is depicted in FIG. 1, a particular instance in which the problem of audio feedback may arise. A police officer 11 is shown utilizing two-way radio equipment. He is holding a transmitter 13 in position for transmitting a voice message while at the same time a receiver 15 is hooked to his belt. Under these circumstances, audio feedback can occur if receiver 15 is left turned on while transmitter 13 is being used. That is, the audio signal from the receiver 15 may be picked up by transmitter 13 and transmitted back to receiver 15, causing a rapid build-up in receiver output. A howl issues from the receiver which renders communication impossible. However, when receiver 15 is constructed in accordance with the invention, this problem will be avoided.

Referring now to FIG. 2, a schematic diagram of a receiver constructed in accordance with the invention is shown. The receiver 15 of FIG. 2 is a double conversion superheterodyne receiver for receiving frequency modulated waves. The receiver includes a radio frequency amplifier 17 of any desired number of stages. The radio frequency amplifier is coupled to a suitable antenna 19, and its output is connected to a first mixer 21. Crystal controlled oscillator 25 provides the local oscillations for the first mixer 21 which are increased to the desired frequency by multiplier and filter 27, and fed to the mixer 21. The output of the first mixer 21 is a high intermediate frequency signal which is applied to intermediate frequency amplifier 23, which similarly may have any desired number of stages.

The signal produced in the first mixer is amplified in the high IF amplifier stage 23 and fed to the second mixer 31. Here it is mixed with the local oscillations produced by a low frequency crystal controlled oscillator 33.

The low IF signal produced in the second mixer 31 is fed into a plurality of low intermediate frequency amplifier stages 35, 37 and 39. The circuit of intermediate amplifier 37 is illustrated, and includes two transistors 40 forming two amplifier stages. A passive filter 41 is placed in the circuit between the low IF stages 37 and 39 to provide the required selectivity.

The low IF stages are followed by a limiter 43 and a discriminator 45. Discriminator 45 translates the variations in frequency of the IF signal to an audio frequency signal which is then coupled to the first audio amplifier 47. Amplified audio signals are then fed to the audio output amplifier 49 which drives speaker 51. The output amplifier 49 includes a driver stage 115 and push-pull output stages 117 and 119.

Squelch action is provided by taking the noise produced at the supply voltage decoupling point 53 of limiter 43, removing the residual IF signal, amplifying that portion of the noise above the normal voice frequency range, rectifying this noise and applying it as bias to the driver transistor 115 of audio output stage 49. When the receiver is not quieted (in the absence of an RF carrier wave), this bias is sufficient to cut off the transistor 115 and interrupt the signals applied to the speaker. When a carrier wave is received, the noise in the receiver is reduced and the bias developed by the squelch circuit is not sufficient to cut off the transistor 115, so that received signals are reproduced.

The amplitude limiter 43 includes a transistor 55, and signals are applied to the base electrode of this transistor from the fourth low IF stage 39. The emitter electrode of transistor 55 is connected to a point of reference potential or ground, and the collector electrode is connected through a tuned network 57 and a series decoupling resistor 59 to a suitable D.C. biasing source such as the negative terminal of a 10 volt biasing source.

The tuned circuit 57 applies signals to the discriminator and is coupled to coil 71 which, with variable coil 73, forms a double tuned circuit. The common junction of the capacitors 75 and 77 is connected to the collector of transistor 55 to provide the usual discriminator action. The remainder of the discriminator 45 is a standard circuit which includes a pair of diodes 79 and 81 connected in the usual manner. The output circuit of discriminator 45 is connected through a variable resistor 83 to the base electrode of a transistor 85 included in the first audio stage 47. This transistor is connected as a grounded emitter amplifier.

The operation of the limiter 43 and squelch circuit 86 is explained in Mitchell Patent No. 2,912,573 issued Nov. 10, 1959, and assigned to the assignee of the present invention. The limiter functions as a detector for deriving noise voltages at point 53, and the voltages above the voice frequencies are filtered by chokes 89 and 90 and capacitors 91 and 93, and applied through potentiometer 95 to the base electrode of transistor 87. The transistor 87 amplifies the noise voltages and these are applied to the rectifier circuit including rectifiers 107 and 109, and capacitors 105 and 111. The rectifier circuit provides voltage doubling action so that a direct current voltage appears across capacitor 111. This bias is applied through coil 113 to the base electrode of transistor 115 to control the conductivity of this transistor.

A capacitor 121 is connected from the output of the second low IF stage 37 to the base of transistor 87. The value of capacitor 121 is chosen so that the impedance is of a value such that when a strong signal appears at the output of the second low IF stage 37, a signal at low IF frequency is fed to the noise amplifier. Transistor 87 has gain at the low IF frequency and the output produces a rectified bias voltage across capacitor 111. This bias voltage is applied to the base electrode of transistor 115 to reduce its gain.

At normal operating signal levels, the signal coupled through capacitor 121 has no effect on receiver operation. However, when the received signal is very strong the signal applied to the squelch circuit causes a rectified bias which tends to reduce the gain of the audio amplifier. The circuit impedance value can be chosen so that the audio is completely cut off, or so that the audio is reduced in level under a strong signal. By reducing the gain of the audio output transistor 115, there is less audio output for the transmitter to pick up and hence the audio feedback is inhibited.

It is to be pointed out that coupling of signals from the IF amplifier to the squelch circuit can be accomplished by an element other than a capacitor. This could be any frequency selective network such as an LC filter or a choke which applies a controlled part of the signal at the IF amplifier to the squelch circuit.

From the foregoing discussion, it may be seen that the invention provides a simple, low cost circuit for improving operation of a radio receiver having a squelch circuit, such that the squelch circuit will operate to prevent audio feedback. Such circuitry is simple and efficient and provides an improved receiver which, when used in two-way radio systems, eliminates audio feedback problems.

I claim:

1. A miniature superheterodyne frequency modulation radio receiver having provision for reducing audio output when a very strong signal is received, said receiver including in combination, an intermediate frequency amplifier, a limiter circuit coupled to said intermediate frequency amplifier, a detector circuit coupled to said limiter circuit for deriving audio frequency signals from the limited intermediate frequency signals, audio amplifier means connected to said detector circuit including a first transistor for amplifying audio frequency signals of the receiver, a squelch circuit coupled to said first transistor for biasing the same to control the conductivity thereof, said limiter circuit including a portion providing detected noise signals, said squelch circuit including a second transistor and filter means connected to said limiter circuit portion for applying detected noise signals above a predetermined frequency to said second transistor, rectifier means connected to the output of said second transistor for providing a bias for said first transistor to render said first transistor non-conducting in response to noise signals which exceed a predetermined level, and frequency selective means including capacitor means connected between the output of said intermediate frequency amplifier and the input of said second transistor, said frequency selective means coupling signals from said intermediate frequency amplifier to said second transistor to affect the bias of said first transistor and reduce its gain in response to signals in said intermediate frequency amplifier which reach a predetermined level.

2. A superheterodyne frequency modulation radio receiver having provisions for cutting off the audio output when a very strong signal is received, said receiver including in combination, an intermediate frequency amplifier circuit, a limiter circuit coupled to said intermediate frequency amplifier circuit, a detector circuit coupled to said limiter circuit for deriving audio frequency signals from the limited intermediate frequency signals, audio amplifier means connected to said detector circuit including a first transistor for amplifying detected audio frequency signals, a squelch circuit including a second transistor coupled to said first transistor, said second transistor being connected to said first transistor to bias the same to cut off in response to conduction of said second transistor, said limiter circuit including a portion providing detected noise signals, said squelch circuit including filter means connecting said portion of said limiter circuit to said second transistor for applying detected noise signals above a predetermined frequency to said second transistor to render the same conductive, and frequency selective means including capacitor means connected between the output of said intermediate frequency amplifier circuit and said second transistor, said frequency selective means coupling signals from said intermediate frequency amplifier circuit to said second transistor to render the same conductive in response to signals in said intermediate frequency amplifier circuit which reach a predetermined level and thereby cut off said first transistor.

References Cited by the Examiner

UNITED STATES PATENTS

| | | | |
|---|---|---|---|
| 2,200,037 | 5/1940 | Mountjoy | 325—404 |
| 2,681,989 | 6/1954 | Cunniff | 325—478 |
| 2,912,573 | 11/1959 | Mitchell | 325—319 |
| 2,948,808 | 8/1960 | Neumann et al. | 325—478 X |

ROBERT H. ROSE, *Primary Examiner.*

DAVID G. REDINBAUGH, *Examiner.*